(12) United States Patent
Agehama

(10) Patent No.: US 8,289,576 B2
(45) Date of Patent: Oct. 16, 2012

(54) IMAGE FORMING SYSTEM, IMAGE FORMING APPARATUS, TERMINAL DEVICE, GRADATION CHARACTERISTIC MEASURING METHOD, COMPUTER READABLE MEDIUM STORING PROGRAM AND GRADATION CHARACTERISTIC MEASUREMENT SHEET

(75) Inventor: Ryo Agehama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/400,126

(22) Filed: Feb. 20, 2012

(65) Prior Publication Data

US 2012/0147427 A1 Jun. 14, 2012

Related U.S. Application Data

(63) Continuation of application No. 12/365,183, filed on Feb. 4, 2009.

(30) Foreign Application Priority Data

Sep. 16, 2008 (JP) .................................. 2008-236172

(51) Int. Cl.
*H04N 1/60* (2006.01)

(52) U.S. Cl. ........................... 358/1.9; 358/406; 358/504

(58) Field of Classification Search .................. 358/1.1, 358/1.9, 1.15, 406, 504, 518; 382/162, 167
See application file for complete search history.

(56) References Cited

U.S. PATENT DOCUMENTS

| | | |
|---|---|---|
| 5,760,913 A | 6/1998 | Falk |
| 6,002,489 A | 12/1999 | Murai et al. |
| 6,320,668 B1 | 11/2001 | Kim |
| 6,327,047 B1 | 12/2001 | Motamed |
| 6,404,517 B1 | 6/2002 | Chao |
| 6,750,993 B1 | 6/2004 | Shirai |
| 6,853,464 B1 | 2/2005 | Ueda et al. |
| 6,975,418 B1 | 12/2005 | Ohta et al. |
| 7,161,719 B2 | 1/2007 | Wu et al. |
| 7,545,541 B2 * | 6/2009 | Dalrymple et al. .......... 358/3.28 |
| 7,965,417 B2 | 6/2011 | Ishikawa |
| 2004/0114157 A1 | 6/2004 | Linder et al. |
| 2004/0212816 A1 | 10/2004 | Tanabe et al. |
| 2005/0264640 A1 | 12/2005 | Kitazawa |
| 2005/0270321 A1 | 12/2005 | Ono |

(Continued)

FOREIGN PATENT DOCUMENTS

JP 2001-180090 A 7/2001

(Continued)

OTHER PUBLICATIONS

Japanese Office Action dated Jul. 21, 2010 for corresponding Japanese patent application No. 2008-236172.

*Primary Examiner* — Kimberly A Williams
(74) *Attorney, Agent, or Firm* — Sughrue Mion, PLLC

(57) ABSTRACT

A terminal device includes: a colorimetry unit that performs colorimetry on color values of respective measurement regions on a gradation characteristic measurement sheet where the plural measurement regions are formed in different densities; and a determination unit that determines identification information to identify the gradation characteristic measurement sheet based on a result of colorimetry of identification information measurement regions arranged to identify the gradation characteristic measurement sheet in a result of colorimetry by the colorimetry unit.

10 Claims, 14 Drawing Sheets

U.S. PATENT DOCUMENTS

| | | |
|---|---|---|
| 2006/0028699 A1 | 2/2006 | Venable et al. |
| 2007/0133061 A1 | 6/2007 | Bang et al. |
| 2009/0033957 A1 | 2/2009 | Hardy |
| 2009/0086234 A1 | 4/2009 | Oles |
| 2009/0244642 A1 | 10/2009 | Dalrymple et al. |
| 2011/0080607 A1 | 4/2011 | Ulichney et al. |
| 2011/0122428 A1 | 5/2011 | Itagaki et al. |

FOREIGN PATENT DOCUMENTS

| | | |
|---|---|---|
| JP | 2004-247914 A | 9/2004 |
| JP | 2005-328255 A | 11/2005 |
| JP | 2005-339185 A | 12/2005 |
| JP | 2006-076139 A | 3/2006 |
| JP | 2007-221571 A | 8/2007 |

* cited by examiner

FIG. 11

| PATCH NUMBER | CONTENT |
|---|---|
| 1A | #0 REFERENCE COLOR (Y100%) |
| 1B | #1 REFERENCE COLOR (M100%) |
| 1C | #2 REFERENCE COLOR (C100%) |
| 1D | #3 REFERENCE COLOR (K100%) |
| 1E | REFERENCE COLOR END INFORMATION (SAME COLORIMETRIC VALUE AS PATCH #0) |
| 1F | PATCH TYPE INFORMATION |
| 1G, 1H | SUBJECT TRAY INFORMATION |
| 1I, 1J, 2A, 2B | OUTPUT PRINTER SPECIFIC ID INFORMATION |
| 2C | CHECK SUM (PATCH HAVING NUMBER OBTAINED BY INTEGRATING VALUES OF PATCHES 1F-2B AND DIVIDING INTEGRATED VALUE BY NUMBER OF REFERENCE COLORS) |

1G, 1H  SUBJECT TRAY INFORMATION

0#0···TRAY 1
0#1···TRAY 2
0#2···TRAY 3
0#3···TRAY 4
1#0···TRAY 5
1#1···ALL
1#2~#3#2···UNUSED
3#3···UNALLOCATED

1I, 1J, 2A, 2B  OUTPUT PRINTER SPECIFIC ID INFORMATION

0#0#0#0···0000
0#0#0#1···0001
0#0#0#2···0002
·
·
3#3#3#2···0254
3#3#3#3···0255

IMAGE FORMING SYSTEM, IMAGE FORMING APPARATUS, TERMINAL DEVICE, GRADATION CHARACTERISTIC MEASURING METHOD, COMPUTER READABLE MEDIUM STORING PROGRAM AND GRADATION CHARACTERISTIC MEASUREMENT SHEET

CROSS-REFERENCE TO RELATED APPLICATION

This application is a Rule 53(b) Continuation of U.S. patent application Ser. No. 12/365,183 filed Feb. 4, 2009, which is based on and claims priority under 35 USC 119 from Japanese Patent Application No. 2008-236172 filed Sep. 16, 2008. The above-noted applications are incorporated herein by reference in their entirety.

BACKGROUND

Technical Field

The present invention relates to an image forming system, an image forming apparatus, a terminal device, a gradation characteristic measuring method, a computer readable medium storing a program and a gradation characteristic measurement sheet.

SUMMARY

According to an aspect of the invention, there is provided a terminal device including: a colorimetry unit that performs colorimetry on color values of respective measurement regions on a gradation characteristic measurement sheet where the plural measurement regions are formed in different densities; and a determination unit that determines identification information to identify the gradation characteristic measurement sheet based on the result of colorimetry of identification information measurement regions arranged to identify the gradation characteristic measurement sheet in a result of colorimetry by the colorimetry unit.

BRIEF DESCRIPTION OF THE DRAWINGS

An exemplary embodiment of the present invention will be described in detail based on the following figures, wherein:

FIG. 11 shows an example of relation between the array of the identification information patch 82 and corresponding identification information;

DETAILED DESCRIPTION

Next, an exemplary embodiment of the present invention will be described in detail based on the drawings.

Figure 1:
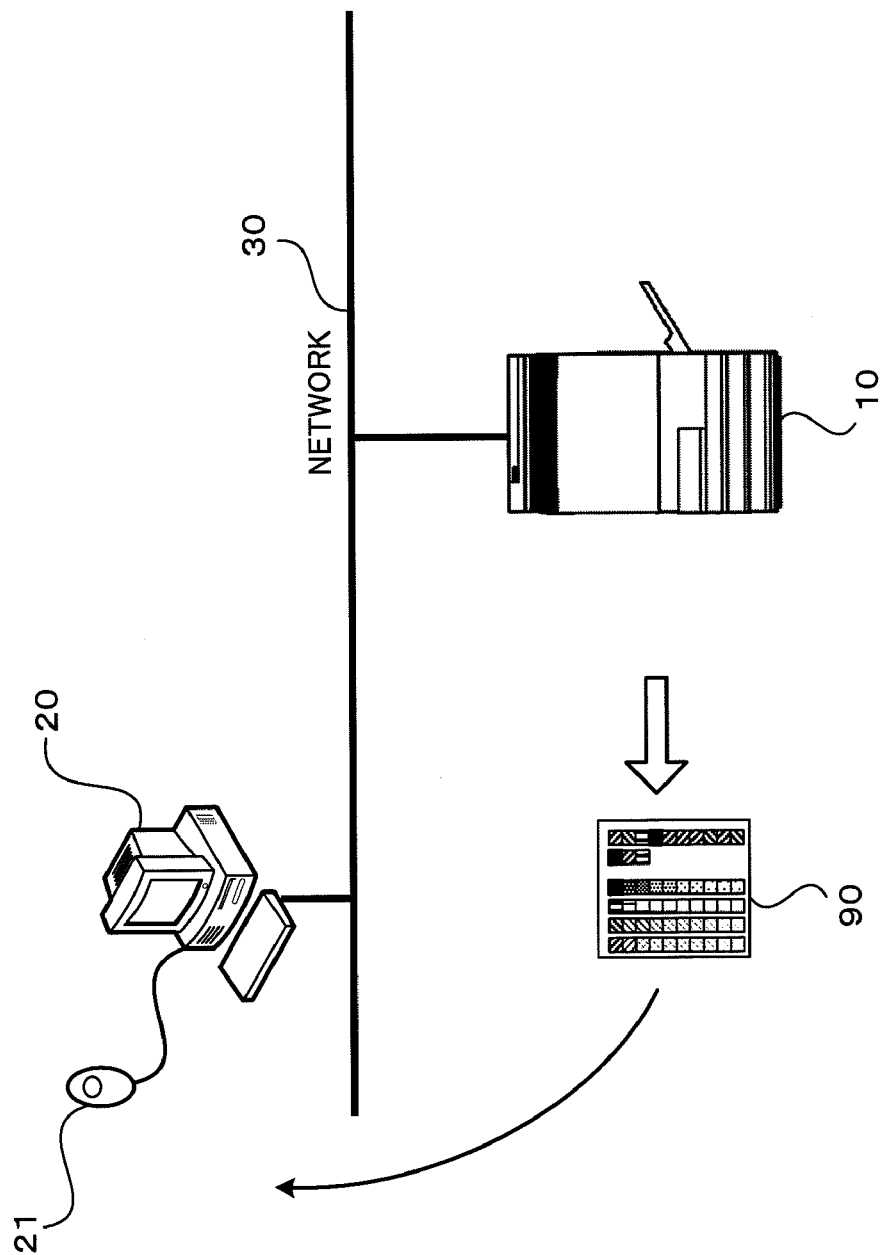
FIG. 1 illustrates a system configuration of an image forming system according to an exemplary embodiment of the present invention.

FIG. 1 illustrates a system configuration of an image forming system according to the exemplary embodiment of the present invention.

As shown in FIG. 1, the image forming system according to the exemplary embodiment of the present invention has an image forming apparatus 10 and a terminal device 20 interconnected via a network 30. Note that it may be arranged such that the terminal device 20 and the image forming apparatus 10 are not directly connected and a controller (print control device) is provided therebetween. In the present exemplary embodiment, however, the function of the controller is included in the image forming apparatus 10.

The terminal device 20 generates print data and transmits the generated print data via the network 30 to image forming apparatus 10. The image forming apparatus 10 receives the print data transmitted from the terminal device 20, and outputs an image corresponding to the print data on a print sheet. Note that the image forming apparatus 10 may be a so-called multifunction device having plural functions of a print function, a scan function, a duplication (copying) function, a facsimile function and the like.

When gradation correction (calibration) is performed, the image forming apparatus 10 print-outputs a color chart (gradation characteristic measurement sheet) 90 in which plural patches (measurement regions) in different densities are provided for gradation characteristic measurement.

The terminal device 20, connected to a chromatometer 21, performs colorimetry on color values of the respective patches in the color chart 90 printed by the image forming apparatus 10. The colorimetric data obtained by the terminal device 20 is transferred via the network 30 to the image forming apparatus 10, and calibration data for gradation correction is generated.

Figure 2:
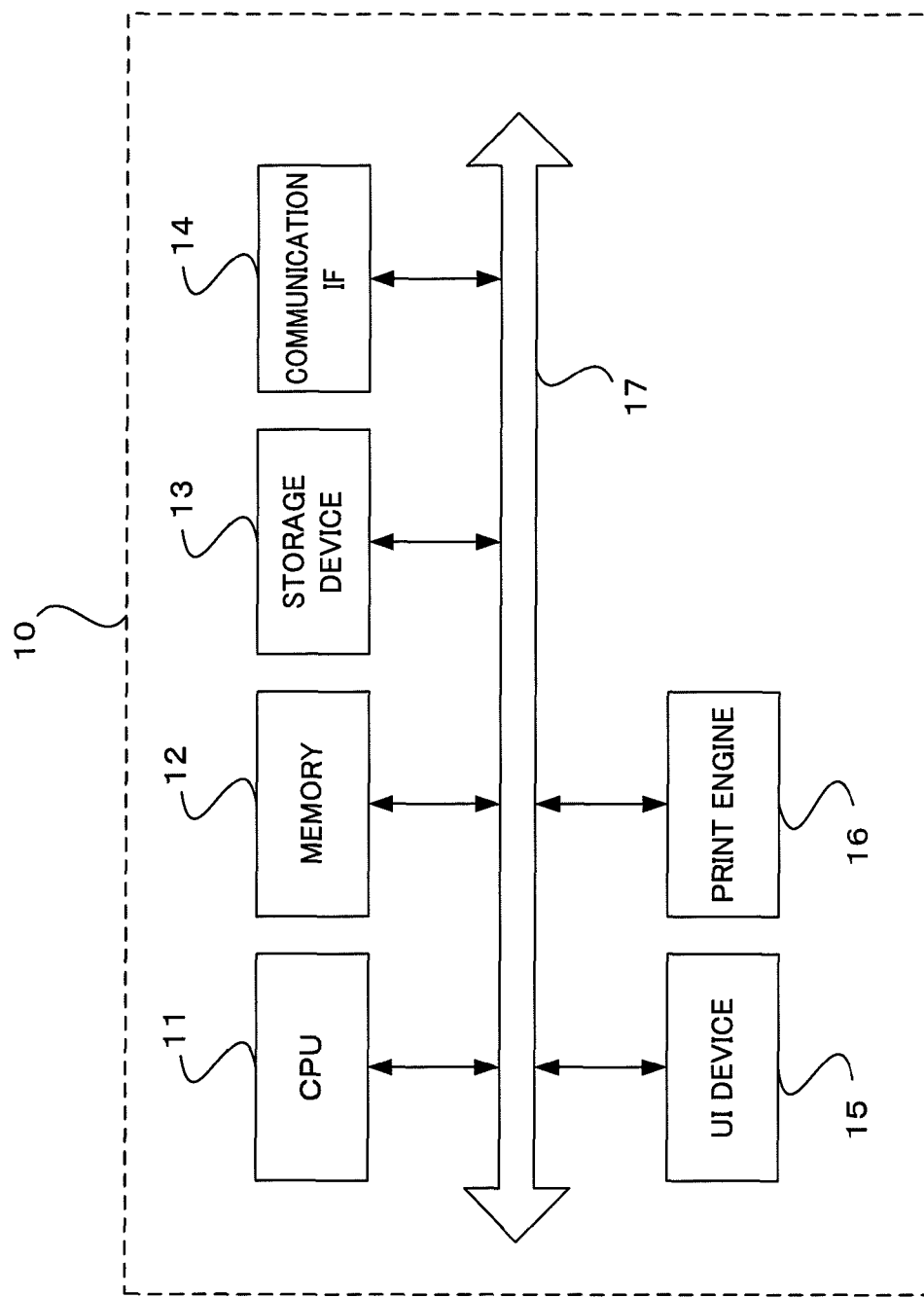
FIG. 2 is a block diagram showing a hardware configuration of an image forming apparatus 10 in the exemplary embodiment of the present invention.

Next, FIG. 2 shows a hardware configuration of the image forming apparatus 10 in the image forming system in the present exemplary embodiment.

As shown in FIG. 2, the image forming apparatus 10 has a CPU 11, a memory 12, a storage device 13 such as a hard disk drive (HDD), a communication interface (IF) 14 for data transmission/reception between the image forming apparatus 10 and an external device or the like via the network 30, a user interface (UI) device 15 including a touch panel or a liquid crystal display and a keyboard, and a print engine 16. These constituent elements are interconnected via a control bus 17.

The CPU 11 performs predetermined processing based on a control program stored in the memory 12 or the storage device 13 to control the operation of the image forming apparatus 10.

Note that in the present exemplary embodiment, the CPU 11 reads the control program stored in the memory 12 or the storage device 13 and executes the program. However, it may be arranged such that the program is stored on a storage medium such as a CD-ROM and provided to the CPU 11.

Figure 3:
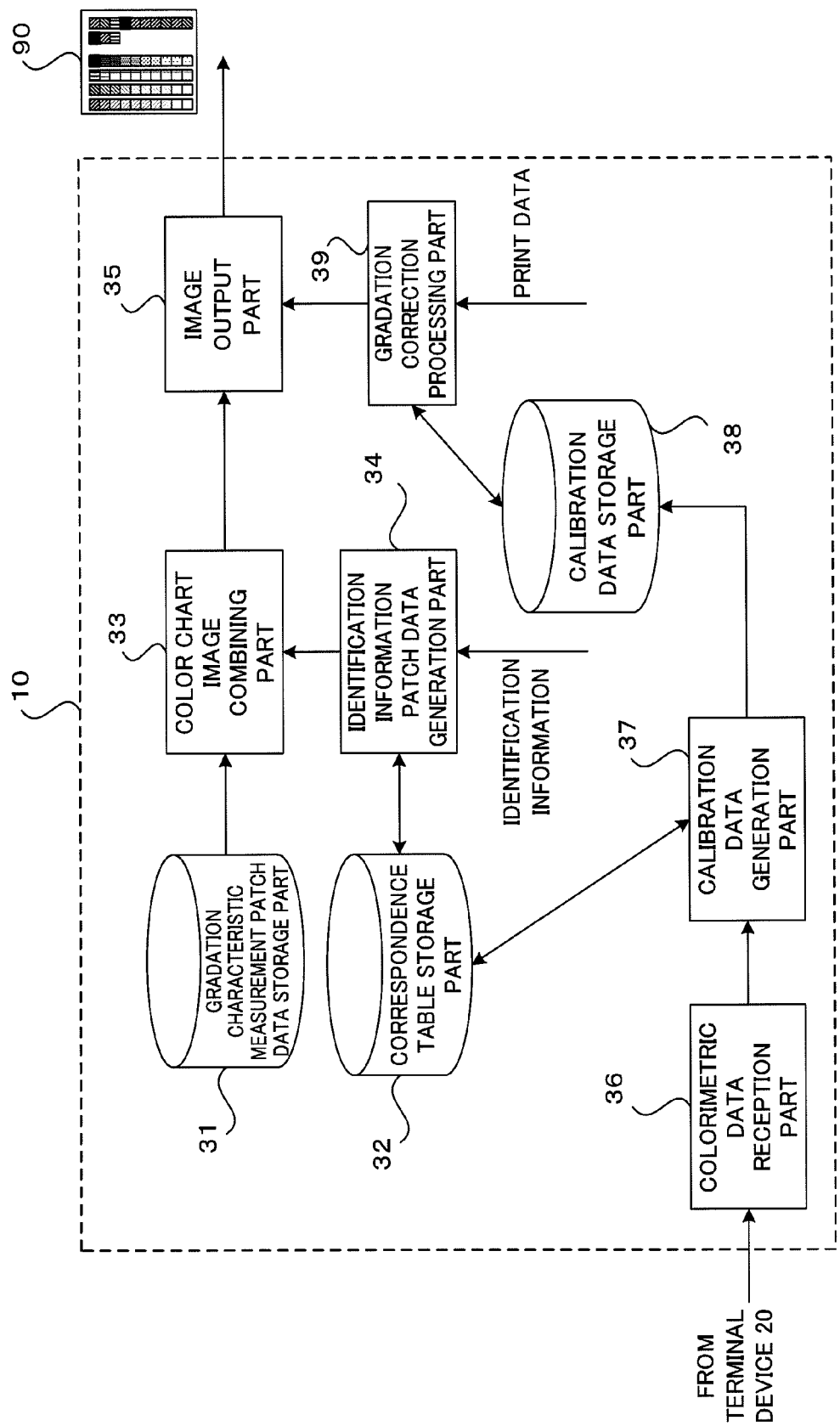
FIG. 3 is a block diagram showing a functional configuration of the image forming apparatus 10 in the exemplary embodiment of the present invention.

FIG. 3 is a block diagram showing a functional configuration of the image forming apparatus 10 realized by execution of the above-described control program.

As shown in FIG. 3, the image forming apparatus 10 in the present exemplary embodiment has a gradation characteristic measurement patch data storage part 31, a correspondence table storage part 32, a color chart image combining part 33, an identification information patch data generation part 34, an image output part 35, a colorimetric data reception part 36, a calibration data generation part 37, a calibration data storage part 38, and a gradation correction processing part 39.

The gradation characteristic measurement patch data storage part 31 holds gradation characteristic measurement patch data for printing plural gradation characteristic measurement patches for gradation characteristics measurement.

The correspondence table storage part 32 holds information indicating correspondence between the array of identification information patches and identification information represented with the array.

The identification information patch data generation part 34 generates identification information patch data, in which patches are arrayed in a particular order, by referring to a correspondence table stored in the correspondence table storage part 32, based on identification information to identify a color chart for gradation characteristic measurement.

Note that as such identification information, at least one of information to specify an image forming apparatus which has outputted the color chart, destination information, type information of gradation characteristic measurement patch for gradation characteristic measurement, time information of time at which the color chart has been outputted, information to specify a subject tray or subject print sheet to which gradation correction is to be applied, or a combination of these information pieces can be given.

The color chart image combining part 33 combines identification information patch data generated by the identification information patch data generation part 34 with gradation characteristic measurement patch data for gradation characteristic measurement.

The image output part 35 outputs the color chart 90 for gradation characteristic measurement based on the image data combined by the color chart image combining part 33.

The colorimetric data reception part 36 receives colorimetric data as the result of colorimetry of respective patches in the color chart 90 from the terminal device 20.

The calibration data generation part 37 generates calibration data for calibration (gradation correction) processing based on the colorimetric data of the gradation characteristic measurement patches received by the colorimetric data reception part 36.

The calibration data storage part 38 holds the calibration data generated by the calibration data generation part 37. Note that the calibration data storage part 38 refers to identification information included in the colorimetric data, and holds the calibration data, together with information on a subject tray, subject print sheet or the like to which calibration is to be applied.

The gradation correction processing part 39 performs calibration (gradation correction) processing on print data to be outputted to the image output part 35 based on the calibration data generated by the calibration data generation part 37.

Figure 4:
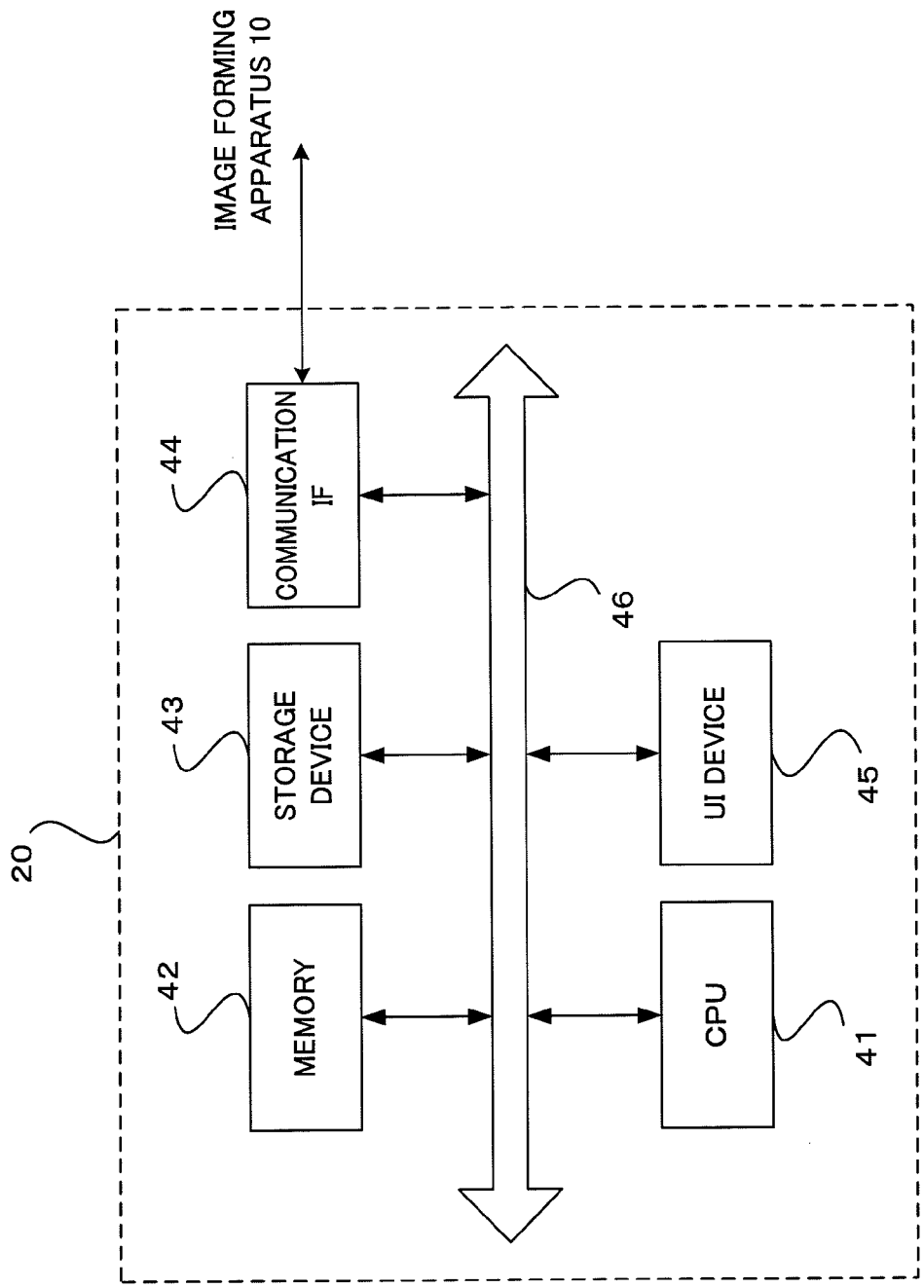
FIG. 4 is a block diagram showing a hardware configuration of a terminal device 20 in the exemplary embodiment of the present invention.

Next, FIG. 4 shows a hardware configuration of the terminal device 20 in the image forming system according to the present exemplary embodiment.

As shown in FIG. 4, the terminal device 20 has a CPU 41, a memory 42, a storage device 43 such as a hard disk drive (HDD), a communication interface (IF) 44 for data transmission/reception between the terminal device 20 and an external device or the like via the network 30, and a user interface (UI) device 45 including a touch panel or a liquid crystal display and a keyboard. The constituent elements are interconnected via a control bus 46.

The CPU 41 performs predetermined processing based on a control program stored in the memory 42 or the storage device 43, to control the operation of the terminal device 20.

Note that in the present exemplary embodiment, the CPU 41 reads the control program stored in the memory 42 or the storage device 43 and executes the program. However, it may be arranged such that the program is stored on a storage medium such as a CD-ROM and provided to the CPU 41.

Figure 5:
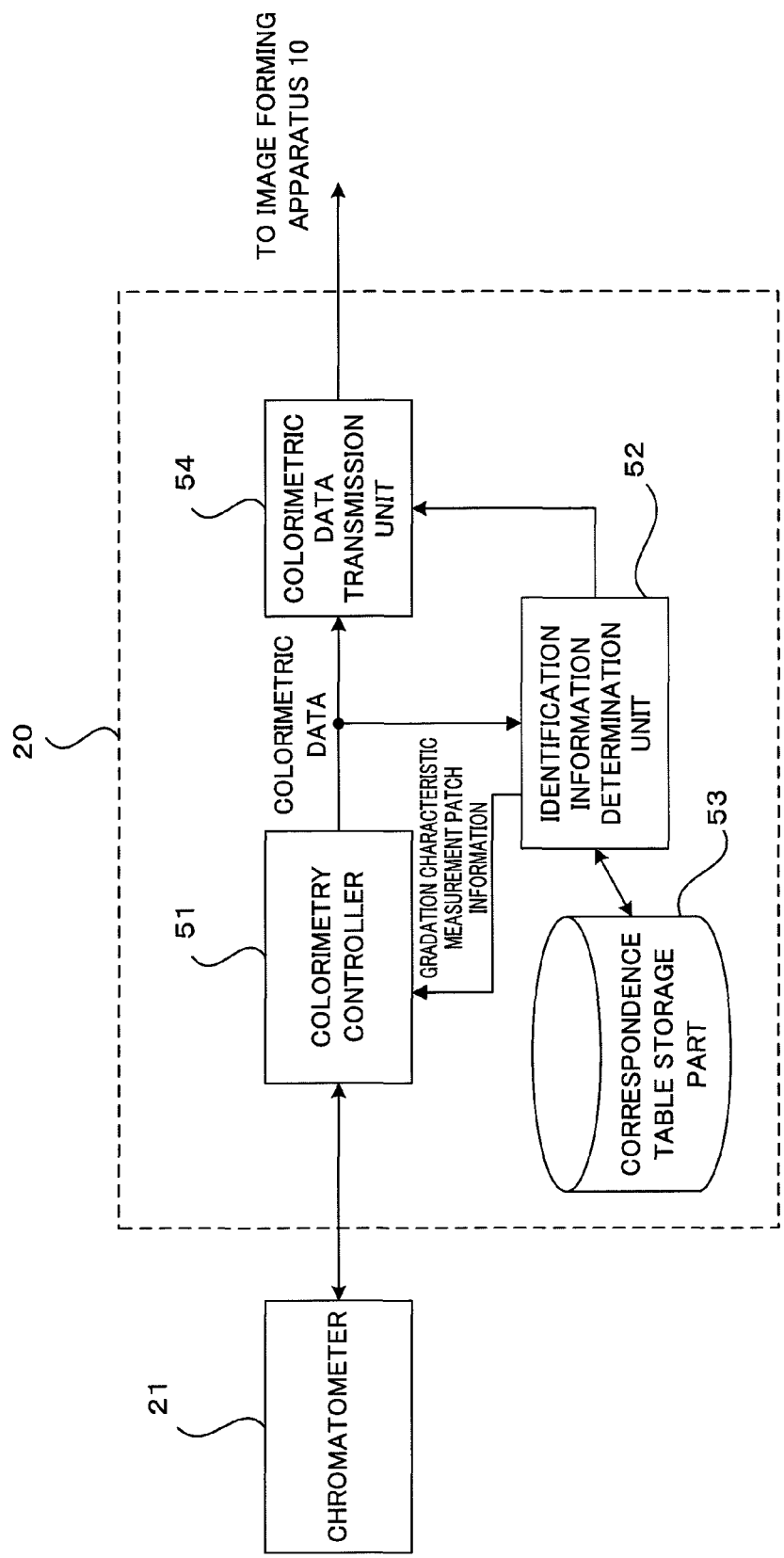
FIG. 5 is a block diagram showing a functional configuration of the terminal device 20 in the exemplary embodiment of the present invention.

FIG. 5 is a block diagram showing a functional configuration of the terminal device 20 realized by execution of the above-described control program.

As shown in FIG. 5, the terminal device 20 in the present exemplary embodiment has a colorimetry controller 51, an identification information determination unit 52, a correspondence table storage part 53, and a colorimetric data transmission unit 54.

The colorimetry controller 51 controls the chromatometer 21 connected to an external device, to perform colorimetry on the color values of respective patches formed in the color chart 90.

As in the case of the correspondence table storage part 32 shown in FIG. 3, the correspondence table storage part 53 holds information indicating correspondence between an array of identification information patches and identification information represented with the array.

The identification information determination unit 52 refers to a correspondence table stored in the correspondence table storage part 53, and determines identification information to identify the color chart 90 (or attribute information indicating an attribute of the color chart 90), based on colorimetric data of the identification information patches arrayed for identification of the color chart 90, in the colorimetric data as the result of colorimetry by the chromatometer 21 and the colorimetry controller 51.

The colorimetric data transmission unit 54 transmits the colorimetric data as the result of colorimetry by the chromatometer 21 and the colorimetry controller 51, with the identification information determined by the identification information determination unit 52, to the image forming apparatus 10.

Next, the operation of the image forming system according to the present exemplary embodiment will be described in detail with reference to the drawings.

Figure 6:
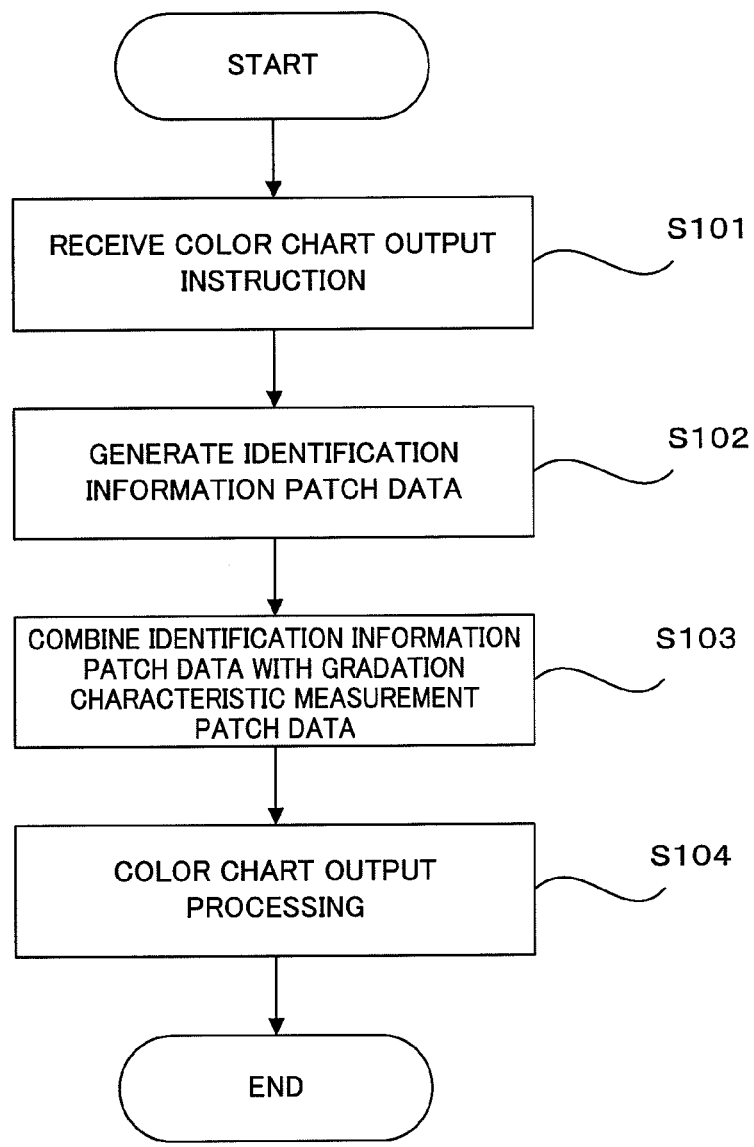
FIG. 6 is a flowchart showing processing upon output of a color chart by the image forming apparatus 10.

First, processing upon output of the color chart by the image forming apparatus 10 will be described with reference to the flowchart of FIG. 6.

When the image forming apparatus 10 receives an instruction to output the color chart for calibration from the terminal device 20 (step S101), the identification information patch data generation part 34 in the image forming apparatus 10 generates identification information patch data where patches are arrayed in correspondence with identification information to be embedded in the color chart (step S102).

Then, the color chart image combining part 33 generates a color chart image by combining the identification information patch data generated by the identification information patch data generation part 34 with gradation characteristic measurement patch data stored in the gradation characteristic measurement patch data storage part 31 (step S103).

Then, based on the color chart image combined by the color chart image combining part 33, print processing is performed by the image output part 35, and the color chart 90 is outputted (step S104).

Figure 7:
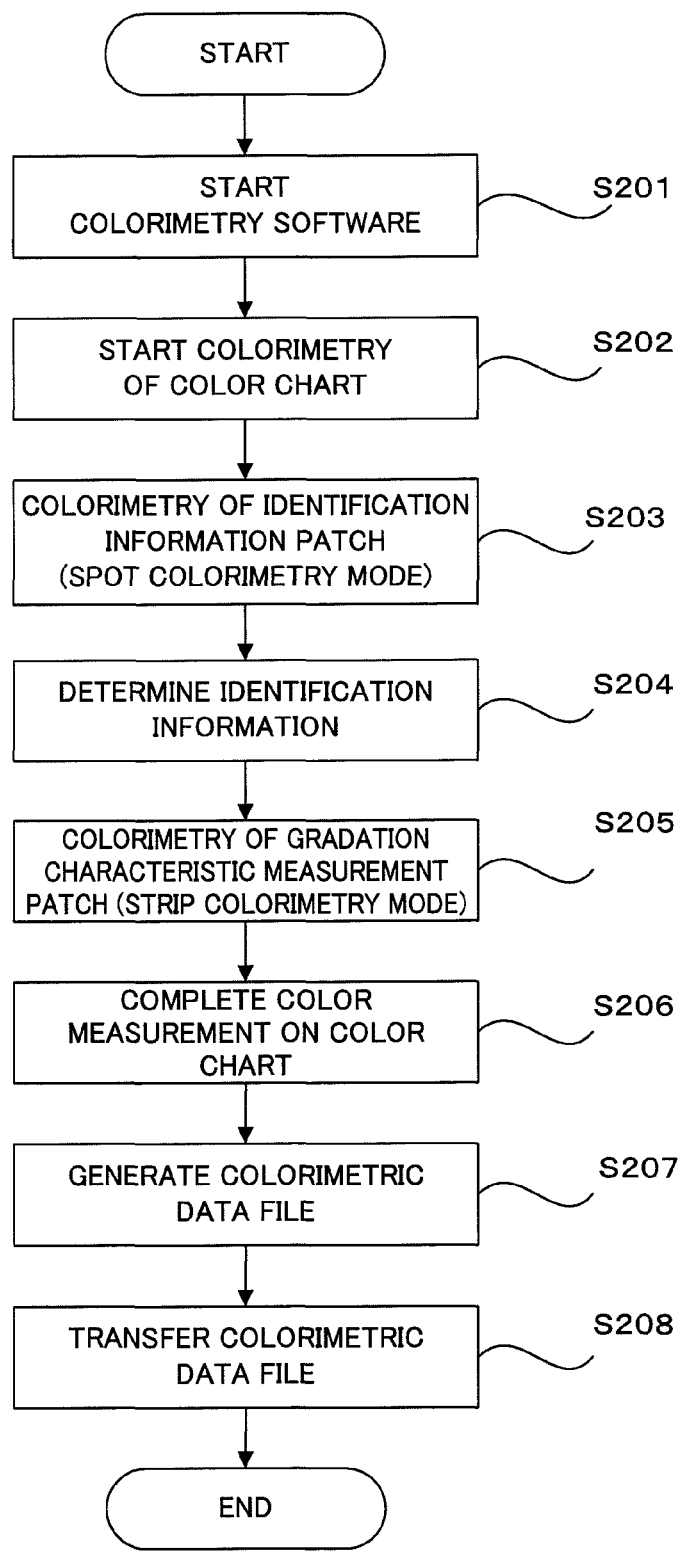
FIG. 7 is a flowchart showing processing upon colorimetry on respective patches in the color chart 90 outputted by the image forming apparatus 10, in the terminal device 20.

Next, processing upon colorimetry of the respective patches in the color chart 90, outputted by the image forming apparatus 10, in the terminal device 20 will be described with reference to the flowchart of FIG. 7.

When colorimetry software is started in the terminal device 20 (step S201), the colorimetry controller 51 controls the chromatometer 21 to start colorimetry of the color chart (step S202).

Then, the colorimetry controller 51 sets the chromatometer 21 into a spot colorimetric mode to perform colorimetry of each patch, and performs colorimetry on the identification information patches (step S203). Then the identification information determination unit 52 determines the identification information embedded in the array of the identification information patches, based on the result of colorimetry of the identification information patch and the correspondence table stored in the correspondence table storage part 53 (step S204).

Next, the colorimetry controller 51 sets the chromatometer 21 into a strip colorimetric mode to continuously perform colorimetry on one array of patches, and performs colorimetry on the gradation characteristic measurement patches (step S205).

Note that when the identification information determined at step S204 includes gradation characteristic measurement patch information, the information is transmitted to the colorimetry controller 51, and the colorimetry controller 51 performs colorimetry on the gradation characteristic measurement patches based on the gradation characteristic measurement patch information.

Then, when the colorimetry of all the patches formed in the color chart 90 has been completed (step S206), a colorimetric data file including the determined identification information is generated (step S207), and the colorimetric data file is transferred to the image forming apparatus 10 by the colorimetric data transmission unit 54 (step S208).

When the identification information determined by the identification information determination unit 52 includes destination information such as ID information and a network address of a printer which has outputted the color chart 90, the image forming apparatus 10 transfers the colorimetric data using the destination information.

Figure 8:
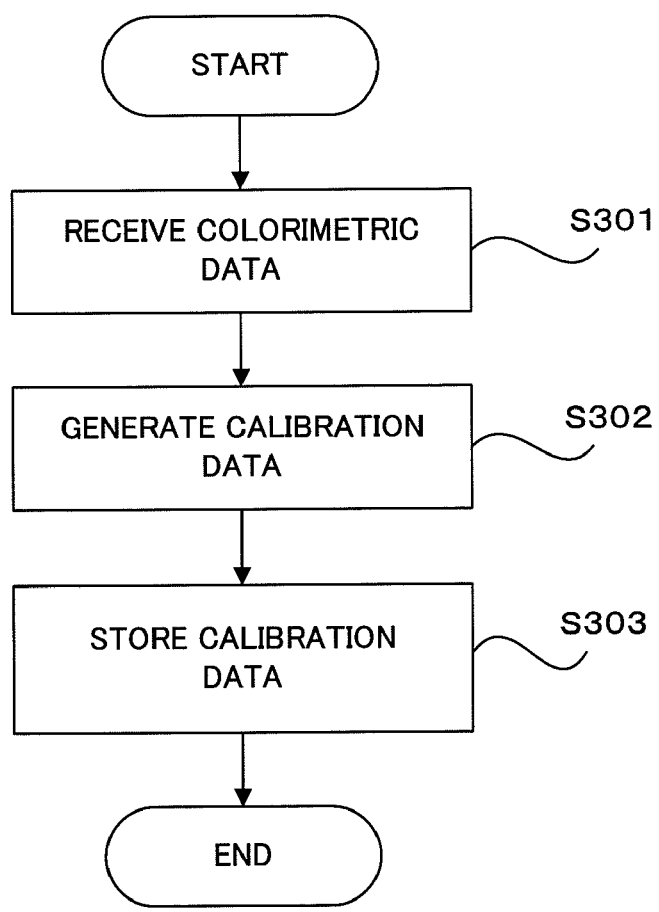
FIG. 8 is a flowchart showing processing upon generation of calibration data in the image forming apparatus 10 which has received a colorimetric data file from the terminal device 20.

Next, processing upon generation of calibration data in the image forming apparatus 10 which has received the colorimetric data file from the terminal device 20 will be described with reference to the flowchart of FIG. 8.

When the colorimetric data file transferred by the terminal device 20 is received by the colorimetric data reception part 36 in the image forming apparatus 10 (step S301), the calibration data generation part 37 compares the result of colorimetry of the respective patches included in the colorimetric data with reference values, and generates calibration data for correction of a gradation characteristic of the image output part 35 (step S302) and stores the calibration data into the calibration data storage part 38 (step S303). The calibration data previously stored in the calibration data storage part 38 is updated with the currently stored calibration data, and a shift of the gradation characteristic of the image output part 35 is corrected.

It may be arranged such that when ID information and network address information of the image forming apparatus are embedded in the identification information included in the colorimetric data from the terminal device 20, and they are different from the ID information and the network address of an image forming apparatus to be subjected to calibration, the calibration data generation part 37 issues a warning or interrupts the processing.

Further, it may be arranged such that, upon output of a new color chart, when a color chart output number and output time information which are updated upon each output are embedded as identification information in the color chart, the calibration data generation part 37 checks the color chart output number and the output time information embedded in the identification information included in the colorimetric data file transferred from the terminal device 20. In this case, when the color chart output number and the output time information do not correspond with the color chart output number and the output time information embedded in a immediately-previously outputted color chart, the calibration data generation part 37 issues a waning or interrupts the processing.

Figure 9:
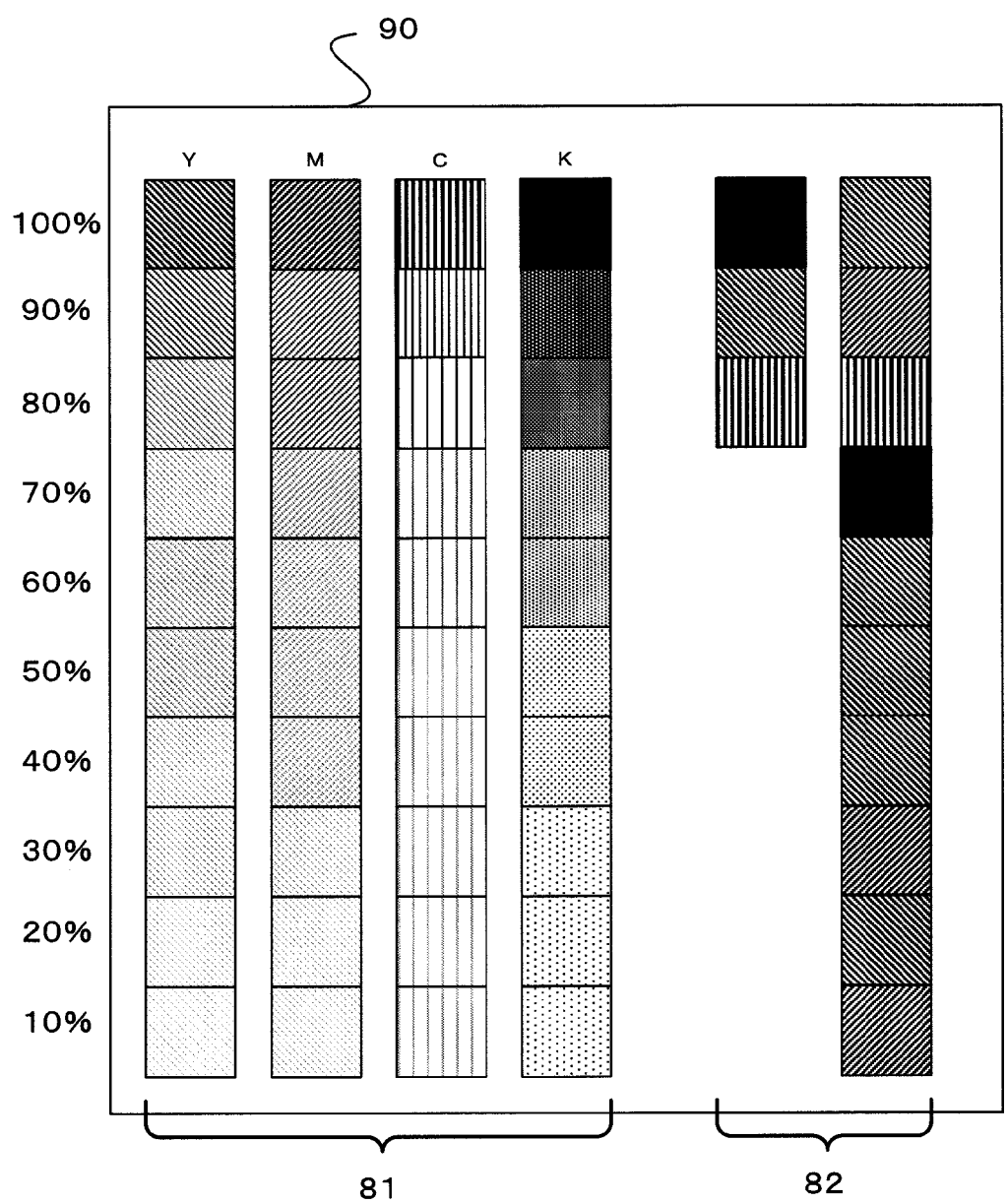
FIG. 9 shows an example of the color chart 90 used in the image forming system according to the exemplary embodiment of the present invention.

Next, FIG. 9 shows an example of the color chart 90 used in the image forming system according to the present exemplary embodiment. In the color chart 90 shown in FIG. 9, a gradation characteristic measurement patch 81 and an identification information patch 82 are formed.

The gradation characteristic measurement patch 81 has plural patches in which YMCK densities are changed stepwisely. In the identification information patch 82, patches in 100% YMCK densities are arrayed in a particular order so as to represent identification information of the color chart 90.

Figure 10:
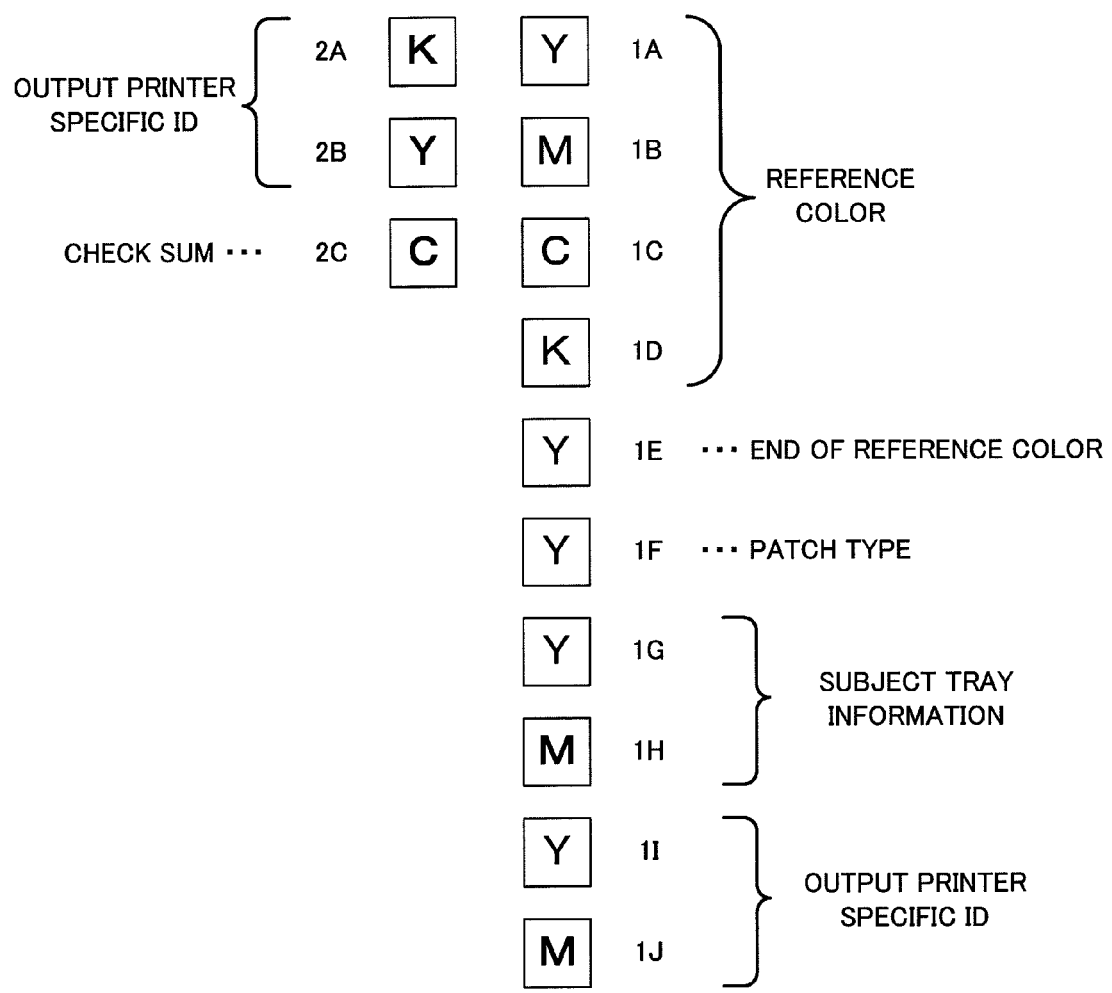
FIG. 10 is an explanatory view showing contents of identification information indicated with respective patches of an identification information patch 82 in the color chart shown in FIG. 9.

More particularly, as shown in FIG. 10, the initial four patches (1A to 1D) indicate YMCK reference colors, and the fifth patch (1E) indicates the end of the reference colors. Further, the sixth patch (1F) indicates a patch type, and the seventh and eighth patches (1G and 1H) indicate subject tray information. The ninth to twelfth patches (1I, 1J, 2A and 2B) indicate an output printer specific ID (ID information of an image forming apparatus), and the thirteenth patch (2C) indicates a check sum.

FIG. 11 shows an example of relation between the array of the identification information patch 82 and indicated identification information. The identification information determination unit 52 can determine contents of various information included in the identification information from the correspondence table as shown in FIG. 11 and the array of the identification information patch 82. For example, as the seventh and eighth patches (1G and 1H) indicating subject tray information are respectively Y (yellow)=#0 and M (magenta)=#1 patches, it can be determined by referring to FIG. 11 that the subject tray information indicates #0#, i.e., a tray 2.

Figure 12:
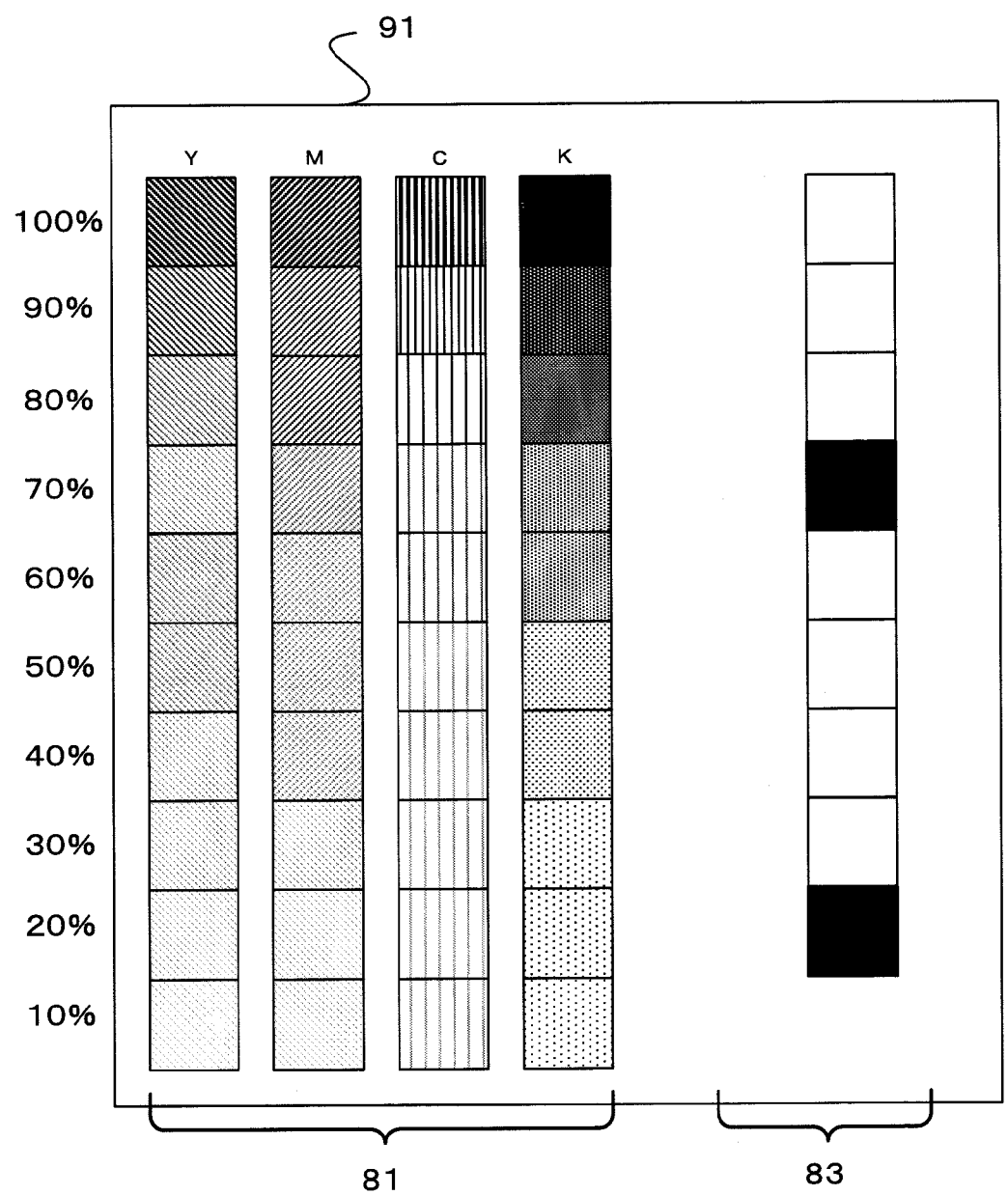
FIG. 12 shows an example a color chart having two types of black and white patches in place of the color patch as the identification information patch.

Further, FIG. 12 shows an example of a color chart 91 having two types of black and white patches in place of the color patches as the identification information patch. The color chart 91 shown in FIG. 12 has the gradation characteristic measurement patch 81 and an identification information patch 83. The identification information patch 83 shown in FIG. 12 is not a fixed patch in which the number of patches is fixed but is a variable patch in which the number of patches varies in accordance with embedded information.

Figure 13:
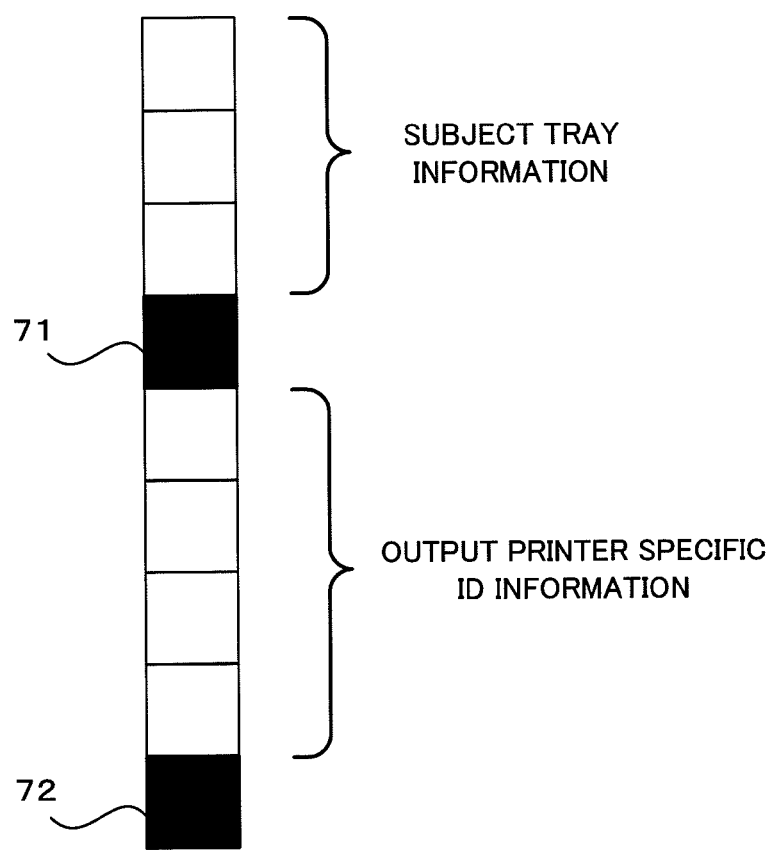
FIG. 13 is an explanatory view showing the structure of an identification information patch 83 in the color chart 91 shown in FIG. 12.

As shown in FIG. 13, the identification information patch 83 has two black patches 71 and 72 and plural white patches divided with the two black patches 71 and 72. The number of first continuous white patches indicates the subject tray information, and the number of second continuous white patches indicates the output printer specific ID information. That is, the two black patches 71 and 72 indicate end positions of the subject tray information and the output printer specific ID information.

Figure 14:
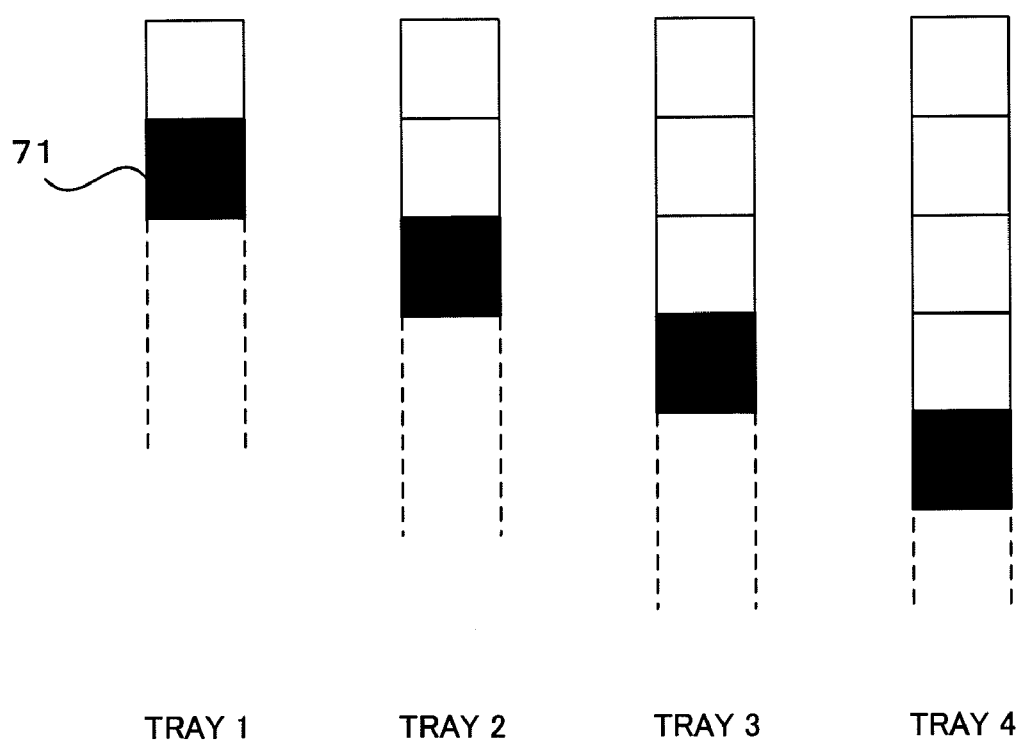
FIG. 14 is an explanatory view showing subject tray information in the identification information patch 83.

As shown in FIG. 14, the subject tray information indicates, with the number of continuous white patches before the occurrence of the black patch 71, the subject tray information to specify a tray to which calibration data is to be applied.

That is, when the number of continuous white patches is 1, the subject tray is a tray 1; when the number of continuous white patches is 2, 3, or 4, the subject tray is the tray 2, a tray 3, or a tray 4.

Modification

In the above-described exemplary embodiment, colorimetry is performed on the identification information patches 82 and 83 prior to the gradation characteristic measurement patch 81, however, the present invention is not limited to this arrangement. For example, the present invention is applicable to a case where colorimetry is performed on the gradation characteristic measurement patch 81 prior to the identification information patches 82 and 83.

Further, in the example of the color chart 90 shown in FIG. 9, one of the YMCK patches indicates the information #0 to #3, however, a combination of two of the YMCK patches may indicate the information #0 to #3. For example, when it is prescribed that Y and M=#0, M and C (cyan)=#1, C and K (black)=#2, and Y=#3, even though a print sheet has a deep color and one of two patches of the YMCK patches is not discriminable, correct information can be guessed as long as the other one of the two patches is discriminable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a receiving unit that receives a colorimetry result obtained by performing colorimetry on a gradation characteristic measurement sheet;
   a gradation correction data generation unit that generates gradation correction data for gradation correction processing in response to the colorimetric result; and
   a gradation correction unit that corrects output image data to be output by an image output unit in response to the gradation correction data;
   wherein the gradation correction data generation unit does not generate the gradation correction data if an output time information embedded in an identification information included in the colorimetric result is different from a latest output time information embedded in an identification information of a gradation characteristic measurement sheet output by the image output unit.

2. An image forming apparatus according to claim 1, further comprising
   a combination unit that combines first region data representing the identification information and second region data representing the gradation characteristic;
   an image output unit that outputs at least one of a gradation characteristic measurement sheet for performing colorimetry in response to the image data combined by the combination unit and a sheet on which the output image data is formed.

3. An image forming apparatus according to claim 1, wherein the gradation correction data generation unit stores a paper feeding tray information, to which the gradation correction data is applied, with the gradation correction data in a storage unit, based on paper feeding tray information embedded in the identification information included in the colorimetric result.

4. The image forming apparatus according to claim 1, wherein at least one region used for increasing the accuracy of the identification information includes a check sum, and the check sum is determined based on a number of reference colors used in color values of measurement regions and color values of at least a portion of identification information measurement regions.

5. The image forming apparatus according to claim 4, wherein the check sum is determined by integrating the color values and dividing the integrated value by the number of reference colors.

6. The image forming apparatus according to claim 4, wherein the at least one region used for increasing the accuracy of the identification information includes a delimiter.

7. A gradation characteristic measuring method performed on an image forming apparatus, the method comprising:
   receiving a colorimetry result obtained by performing colorimetry on a gradation characteristic measurement sheet;
   generating gradation correction data for gradation correction processing in response to the colorimetric result;
   storing the gradation correction data in a non-transitory storing unit; and
   correcting output image data to be output by an image forming apparatus having an output unit outputs at least one of a gradation measurement sheet for performing colorimetry in response to the gradation correction data stored in the storing unit and a sheet on which the output image data is formed;
   wherein the gradation correction data is not generated if network address information embedded in an identification information included in the colorimetric result is different from a network address information of the image forming apparatus.

8. The gradation characteristic measuring method according to claim 7, wherein at least one region used for increasing the accuracy of the identification information includes a check sum, and the check sum is determined based on a number of reference colors used in color values of measurement regions and color values of at least a portion of identification information measurement regions.

9. The gradation characteristic measuring method according to claim 8, wherein the check sum is determined by integrating the color values and dividing the integrated value by the number of reference colors.

10. The gradation characteristic measuring method according to claim 8, wherein the at least one region used for increasing the accuracy of the identification information includes a delimiter.

* * * * *